United States Patent

Rodgers

[11] Patent Number: 6,070,336
[45] Date of Patent: Jun. 6, 2000

[54] FRAMING TOOL

[76] Inventor: Ron D. Rodgers, Rte. 1 Box 167, Bokoshe, Okla. 74930

[21] Appl. No.: 09/041,223

[22] Filed: Mar. 12, 1998

[51] Int. Cl.[7] .............................. G01C 9/00; G01C 9/24; G01B 3/56; G01D 21/00
[52] U.S. Cl. ................................ 33/613; 33/370; 33/381; 33/533; 33/645
[58] Field of Search .............................. 33/533, 381, 370, 33/613, 645

[56] References Cited

U.S. PATENT DOCUMENTS

| 154,677 | 9/1874 | Hyde | 33/613 |
|---|---|---|---|
| 4,625,415 | 12/1986 | Diamontis | 33/533 |
| 4,958,814 | 9/1990 | Johnson | 33/533 |
| 5,884,411 | 3/1999 | Raber | 33/613 |

*Primary Examiner*—Randy W. Gibson

[57] ABSTRACT

A new framing tool for aiding in the construction of a structure. The inventive device includes a member having a substantially straight base side edge, a handle side edge, and a pair of opposite end edges extending between the base side edge and the handle side edge. The base side edge has a plurality of slots extending between the first and second faces of the member. The slots are spaced apart from one another. A first slot is positioned adjacent one of the end edges, while a second slot is positioned adjacent another of the end edges. Third and fourth slots are positioned between the first and second slots.

1 Claim, 2 Drawing Sheets

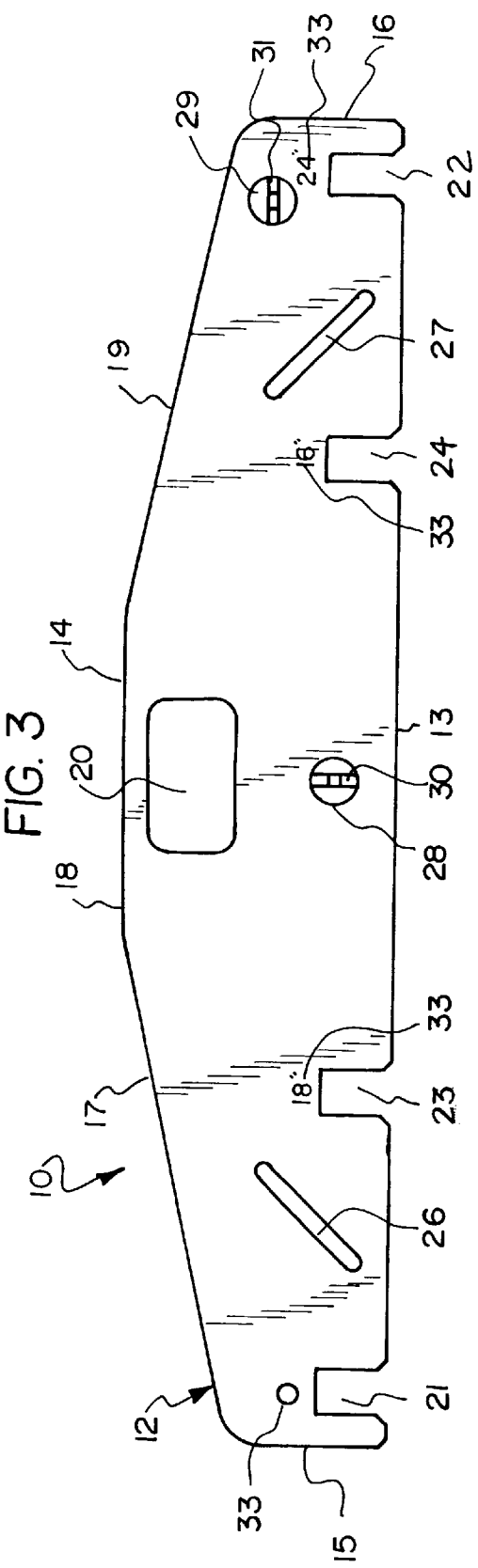
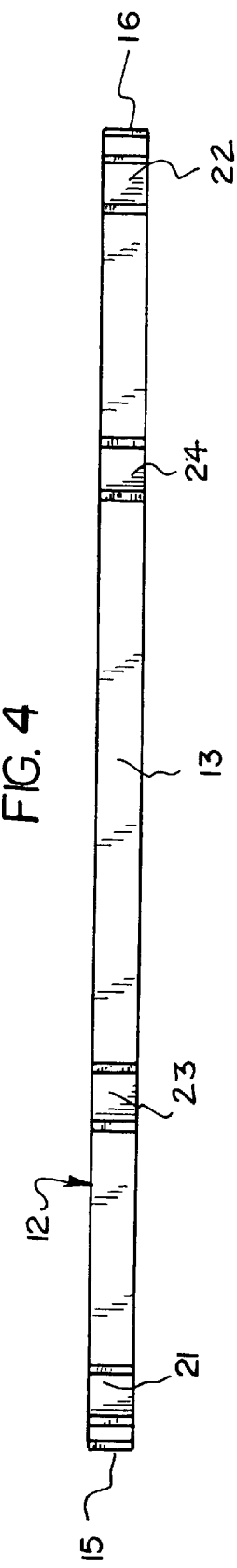

FRAMING TOOL

BACKGROUND OF THE INVENTION

1. Field of the Invention

The present invention relates to tools and more particularly pertains to a new framing tool for aiding in the construction of a structure.

2. Description of the Prior Art

The use of tools is known in the prior art. More specifically, tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art tools include U.S. Pat. No. 3,201,874; U.S. Pat. No. 5,414,918; U.S. Pat. No. 4,944,096; PCT Patent No. WO 91/01480 (Inventor: Brandt); PCT Patent No. WO 88/08115 (Inventor: Huxley et al.); U.S. Pat. No. 4,843,726; and U.S. Pat. No. 686,240.

While these devices fulfill their respective, particular objectives and requirements, the aforementioned patents do not disclose a new framing tool. The inventive device includes a member having a substantially straight base side edge, a handle side edge, and a pair of opposite end edges extending between the base side edge and the handle side edge. The base side edge has a plurality of slots extending between the first and second faces of the member. The slots are spaced apart from one another. A first slot is positioned adjacent one of the end edges, while a second slot is positioned adjacent another of the end edges. Third and fourth slots are positioned between the first and second slots.

In these respects, the framing tool according to the present invention substantially departs from the conventional concepts and designs of the prior art, and in so doing provides an apparatus primarily developed for the purpose of aiding in the construction of a structure.

SUMMARY OF THE INVENTION

In view of the foregoing disadvantages inherent in the known types of tools now present in the prior art, the present invention provides a new framing tool construction wherein the same can be utilized for aiding in the construction of a structure.

The general purpose of the present invention, which will be described subsequently in greater detail, is to provide a new framing tool apparatus and method which has many of the advantages of the tools mentioned heretofore and many novel features that result in a new framing tool which is not anticipated, rendered obvious, suggested, or even implied by any of the prior art tools, either alone or in any combination thereof.

To attain this, the present invention generally comprises a member having a substantially straight base side edge, a handle side edge, and a pair of opposite end edges extending between the base side edge and the handle side edge. The base side edge has a plurality of slots extending between the first and second faces of the member. The slots are spaced apart from one another. A first slot is positioned adjacent one of the end edges, while a second slot is positioned adjacent another of the end edges. Third and fourth slots are positioned between the first and second slots.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new framing tool apparatus and method which has many of the advantages of the tools mentioned heretofore and many novel features that result in a new framing tool which is not anticipated, rendered obvious, suggested, or even implied by any of the prior art tools, either alone or in any combination thereof.

It is another object of the present invention to provide a new framing tool which may be easily and efficiently manufactured and marketed.

It is a further object of the present invention to provide a new framing tool which is of a durable and reliable construction.

An even further object of the present invention is to provide a new framing tool which is susceptible of a low cost of manufacture with regard to both materials and labor, and which accordingly is then susceptible of low prices of sale to the consuming public, thereby making such framing tool economically available to the buying public.

Still yet another object of the present invention is to provide a new framing tool which provides in the apparatuses and methods of the prior art some of the advantages thereof, while simultaneously overcoming some of the disadvantages normally associated therewith.

Still another object of the present invention is to provide a new framing tool for aiding in the construction of a structure.

Yet another object of the present invention is to provide a new framing tool which includes a member having a substantially straight base side edge, a handle side edge, and a pair of opposite end edges extending between the base side edge and the handle side edge. The base side edge has a plurality of slots extending between the first and second faces of the member. The slots are spaced apart from one another. A first slot is positioned adjacent one of the end edges, while a second slot is positioned adjacent another of the end edges. Third and fourth slots are positioned between the first and second slots.

Still yet another object of the present invention is to provide a new framing tool that allows a user to quickly and accurately space frame studs and help determine whether a structure is level.

Even still another object of the present invention is to provide a new framing tool that allows quick and easy positioning of a light or switch box on a structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic side view of the present invention.

FIG. 4 is a schematic base side edge side view of the present invention.

DESCRIPTION OF THE PREFERRED EMBODIMENT

Figure 1:
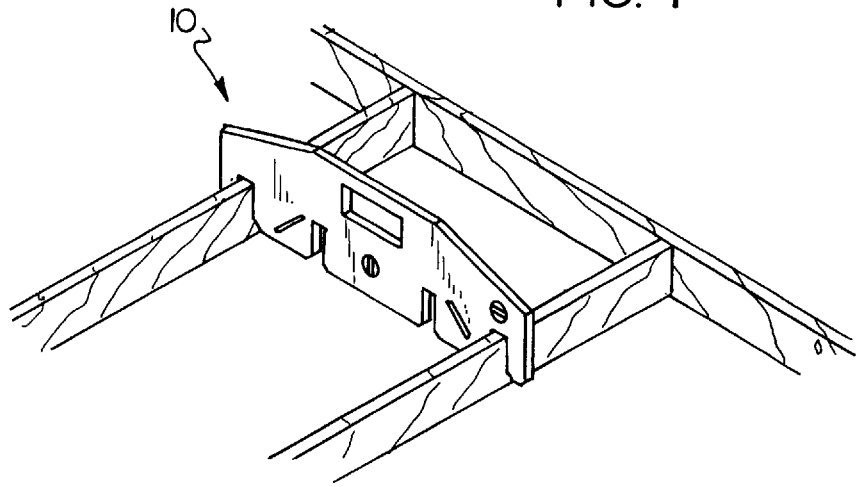
FIG. 1 is a schematic perspective view of a new framing tool in use according to the present invention.
Figure 2:
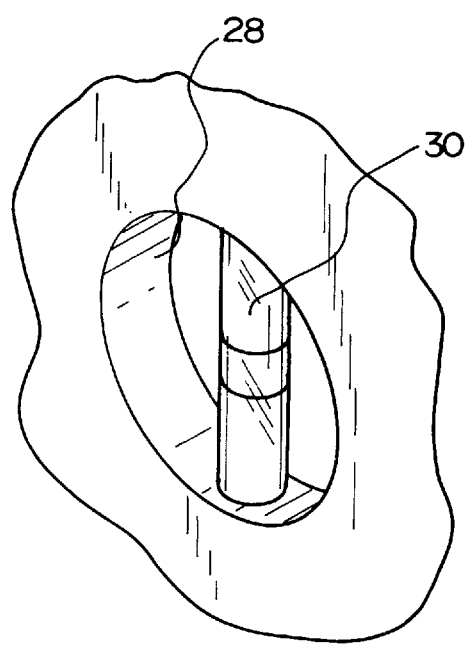
FIG. 2 is a schematic partial perspective view of a bubble vial of the present invention.

With reference now to the drawings, and in particular to FIGS. 1 through 4 thereof, a new framing tool embodying the principles and concepts of the present invention and generally designated by the reference numeral 10 will be described.

As best illustrated in FIGS. 1 through 4, the framing tool 10 generally comprises a member 12 having a substantially straight base side edge 13, a handle side edge 14, and a pair of opposite end edges 15,16 extending between the base side edge 13 and the handle side edge 14. The base side edge 13 has a plurality of slots 21,22,23,24 extending between the first and second faces of the member 12. The slots 21,22, 23,24 are spaced apart from one another. A first slot 21 is positioned adjacent one of the end edges 15,16, while a second slot 24 is positioned adjacent another of the end edges 15,16. Third and fourth slots 22,23 are positioned between the first and second slots 21,24.

In use, as illustrated in FIG. 1, the framing tool 10 allows a user to accurately space structural studs from one another and insure that the structure is level. The tool 10 also permits the accurate scribing of angles and locations for electrical boxes on a structure.

Specifically, the member 12 has first and second faces, a substantially straight base side edge 13, a handle side edge 14, and a pair of opposite end edges 15,16 extending between the base side edge 13 and the handle side edge 14.

Ideally, the member 12 has a length defined between the end edges 15,16 of less than about 28 inches. In this ideal embodiment, the member 12 has a width defined between the side edges 13,14 of less than about 5½ inches. Preferably, the base side edge 13 also has a length extending between the end edges 15,16 of less than about 28 inches.

With reference to FIGS. 3 and 4, the base side edge 13 has a plurality of slots 21,22,23,24 extending between the first and second faces. Each of the slots 21,22,23,24 preferably has a generally square-U-shaped cross section. As shown in use in FIG. 1, the slots 21,22,23,24 are adapted for receiving a stud therein (such as a two-by-four sized stud). Each of the slots 21,22,23,24 has a depth extending from the base side edge 13 towards the handle side edge 14. Ideally, the depths of the slots 21,22,23,24 are substantially perpendicular with the length of the base side edge 13. The slots 21,22,23,24 are spaced apart from one another. A first of the slots 21 is positioned adjacent one of the end edges 15 while a second of the slots 24 is positioned adjacent another of the end edges 16. A third slot 22 is positioned between the first and the second slots 21,24 and is located towards closer towards the first slot 21. A fourth slot 23 is positioned between the third and second of the slots 22,24. Ideally, the first and second slots 21,24 are spaced apart from each other less than about 24 inches preferably as measured from the center of each of the slots 21,24. Also ideally, the first and fourth slots 21,23 are spaced apart from each other less than about 16 inches as measured preferably from the center of each of the slots 21,23. Ideally, the second and third slots 23,24 are spaced apart from one another less than about 18 inches preferably as measured from the center of each of the slots 23,24. The first face of the member 12 preferably has indicia 33 thereon located adjacent each of the slots for indicating the distance between associated slots 21,22,23,24.

The handle side edge 14 has substantially straight first, second and third regions 17,18,19 with the second region 18 interposed between the first and thirds regions 17,19. Each of the regions 17,18,19 of the handle side edge 14 has a length with the length of the second region 18 substantially parallel to the length of the base side edge 13, and the lengths of the first and third regions 17,19 extended at an acute angle with respect to the length of the base side edge 13 such that the handle side edge 14 has the general profile of a trapezoid.

The member 12 has a hole 20 extending between the first and second faces. The hole 20 is generally rectangular and is positioned adjacent the second region 18 of the handle side edge 14. The hole 20 is adapted for use as a handle or for aiding framing of an electrical box at a predetermined distance. The hole 20 has a periphery with a pair of ends and a pair of sides extending between the ends of the periphery of the hole 20. The ends of the periphery of the hole 20 are substantially parallel with the end edges 15,16 of the member 12 while the sides of the periphery of the hole 20 are substantially parallel with the base side edge 13 of the member 12. Ideally, a distance is defined between one of the end edges 15 of the member 12 and an adjacent end of the periphery of the hole 20. Ideally, the distance is less than about 11 inches. Also ideally, the width of the hole 20 between the sides of the periphery of the hole 20 is 2¼ inches, and the length of the hole 20 between the ends of the periphery of the hole 20 is about 3¾ inches.

The member 12 also preferably has a pair of elongate slits 26,27 extending between the first and second faces. Each of the slits 26,27 has a length with one of the slits 26 located between the first and third slots 21,23 and the other slit 27 located between the second and fourth slots 22,24. The slits 26,27 are designed for permitting scribing of an angle on a structure by inserting a writing instrument therethrough. The lengths of the slits 26,27 are extended between the handle side edge 14 and the base side edge 13 at an acute angle with respect to the length of the base side edge 13. Ideally, the lengths of the slits 26,27 are extended at about a 45 degree angle with respect to the length of the base side edge 13.

The member 12 includes a pair of bores 28,29 extending between the first and second faces. Each of the bores 28,29 is preferably generally cylindrical. One of the bores 28 is positioned adjacent the base side edge 13 and the hole 20, while the other bore 29 is positioned adjacent the second slot and the adjacent end edge 16. Each of the bores 28,29 has an bubble vial 30,31 disposed therein. Each of the bubble vials 30,31 is coupled to the member 12 and are designed for indicating whether a structure is level.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A tool, comprising:

a member having first and second faces, a substantially straight base side edge, a handle side edge, and a pair of opposite end edges extending between said base side edge and said handle side edge;

wherein said member has a length defined between said end edges, wherein said length of said member is less than about 28 inches;

said base side edge having a length extending between said end edges, wherein said length of said base side edge is less than about 28 inches;

said base side edge having a plurality of slots extending between said first and second faces, each of said slots having a generally U-shaped cross section;

each of said slots having a depth extending from said base side edge towards said handle side edge, wherein said depths of said slots being substantially perpendicular with being substantially perpendicular with said length of said base side edge;

said slots being spaced apart from one another, a first of said slots being positioned adjacent one of said end edges, a second of said slots being positioned adjacent another of said end edges, a third of said slots being positioned between said first and said second of said slots, a fourth of said slots being positioned between said third and second of said slots;

wherein said first of said slots is spaced apart from said second of said slots less than about 24 inches;

wherein said first of said slots is spaced apart from said fourth of said slots less than about 16 inches;

wherein said third of said slots is spaced apart from said second of said slots less than about 18 inches;

said first face of said member having indicia thereon being located adjacent each of said slots, said indicia indicating the distance between associated slots;

said handle side edge having substantially straight first, second and third regions, said second region being interposed between said first and thirds region;

each of said regions of said handle side edge having a length, said length of said second region being substantially parallel to said length of said base side edge, lengths of said first and third regions being extended at an acute angle with respect to said length of said base side edge;

said member having a hole being extended between said first and second faces, said hole being generally rectangular and being positioned adjacent said second portion of said handle side edge;

said hole having a periphery having a pair of ends and a pair of sides extending between said ends of said periphery of said hole, said ends of said periphery of said hole being substantially parallel with said end edges of said member, said sides of said periphery of said hole being substantially parallel with said base side edge of said member;

wherein a distance is defined between one of said end edges of said member and an adjacent end of said periphery of said hole, wherein said distance is less than about 11 inches;

said member having a pair of elongate slits being extended between said first and second faces, each of said slits having a length, one of said slits being located between said first of said slots and said third of said slots, another of said slits being located between said second of said slots and said fourth of said slots;

said lengths of said slits being extended between said handle side edge and said base side edge at an acute angle with respect to said length of said base side edge;

said member having a pair of bores extending between said first and second faces, each of said bores being generally cylindrical, one of said bores being positioned adjacent said base side edge and said hole, another of said bores being positioned adjacent said second slot and the adjacent end edge; and a pair of bubble vials, each of said bores having an bubble vial disposed therein, each of said bubble vials being coupled to said member.

* * * * *